United States Patent [19]

Coston

[11] Patent Number: 4,713,744
[45] Date of Patent: Dec. 15, 1987

[54] FRACTIONAL FREQUENCY CONVERTER USING ZERO SWITCHING OF INPUT FREQUENCY HALFWAVES

[75] Inventor: David B. Coston, Crossville, Ill.

[73] Assignee: Torcon Products, Inc., Highland Park, Ill.

[21] Appl. No.: 924,049

[22] Filed: Oct. 28, 1986

[51] Int. Cl.[4] .............................................. H02M 5/27
[52] U.S. Cl. ................... 363/160; 318/768; 318/807; 363/10
[58] Field of Search .................... 363/9–11, 363/160–162; 318/768, 772, 807

[56] References Cited

U.S. PATENT DOCUMENTS 4,300,077 11/1981 Katz et al. ........................... 318/768
4,468,726 8/1984 Daigle et al. ........................ 363/161

FOREIGN PATENT DOCUMENTS 22773 7/1970 Japan ................................... 318/768

Primary Examiner—William H. Beha, Jr.
Attorney, Agent, or Firm—Robert M. Wolters

[57] ABSTRACT

A frequency converter is provided for a three-phase electric motor and has input connections for a multiphase alternating current electric supply source, and output connections for connection to a three-phase electric motor. A SCR bridge including a plurality of SCRs interconnects the input connections and the output connections. A trigger circuit is connected to the SCR bridge for selective firing of the SCRs, in response to timing pulses generated upon zero crossing of the input means phases. Logic circuits interconnecting said timing pulse generators and the trigger circuits for effecting selective sequential firing of the SCRs at the zero crossings. Firing of said SCRs is respectively terminated by natural commutation. In one embodiment of the invention single phase current is converted to multiphase current.

19 Claims, 33 Drawing Figures

60 Hz 3 PHASE INPUT WAVEFORM

15 Hz RESULTANT WAVEFORM MOTOR PHASE $L_3-L_1$

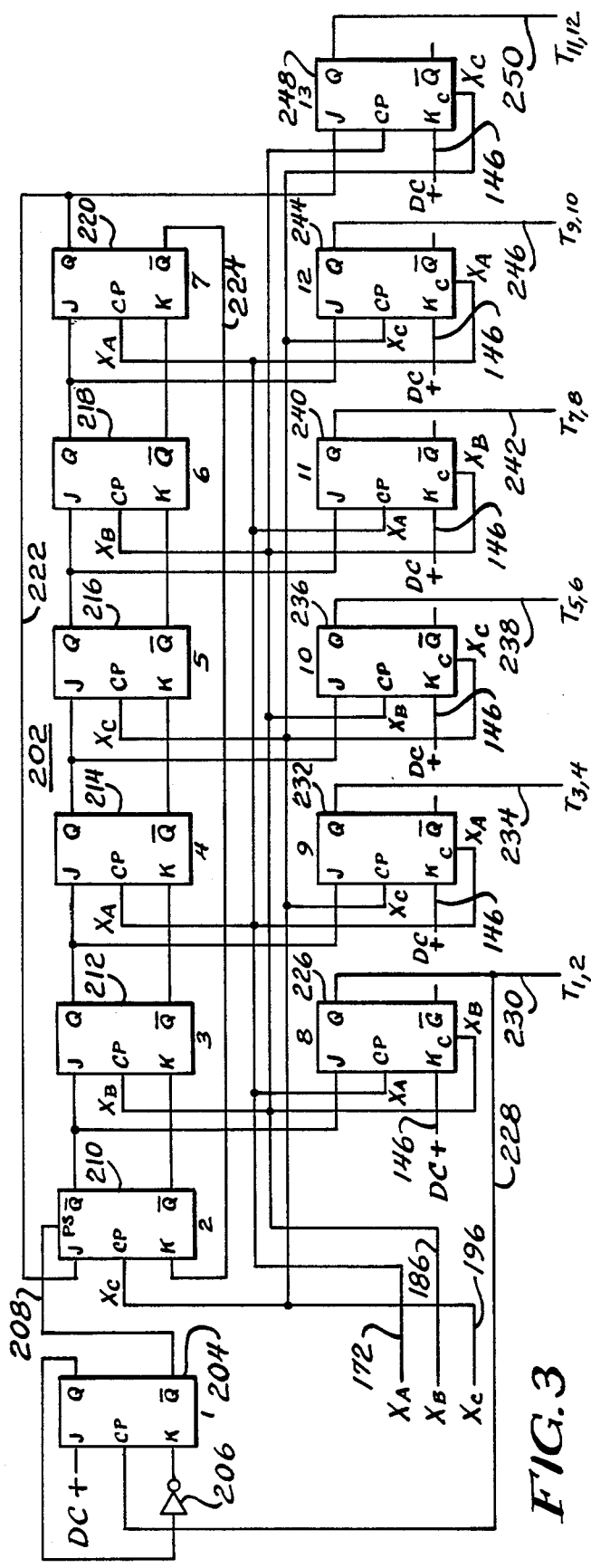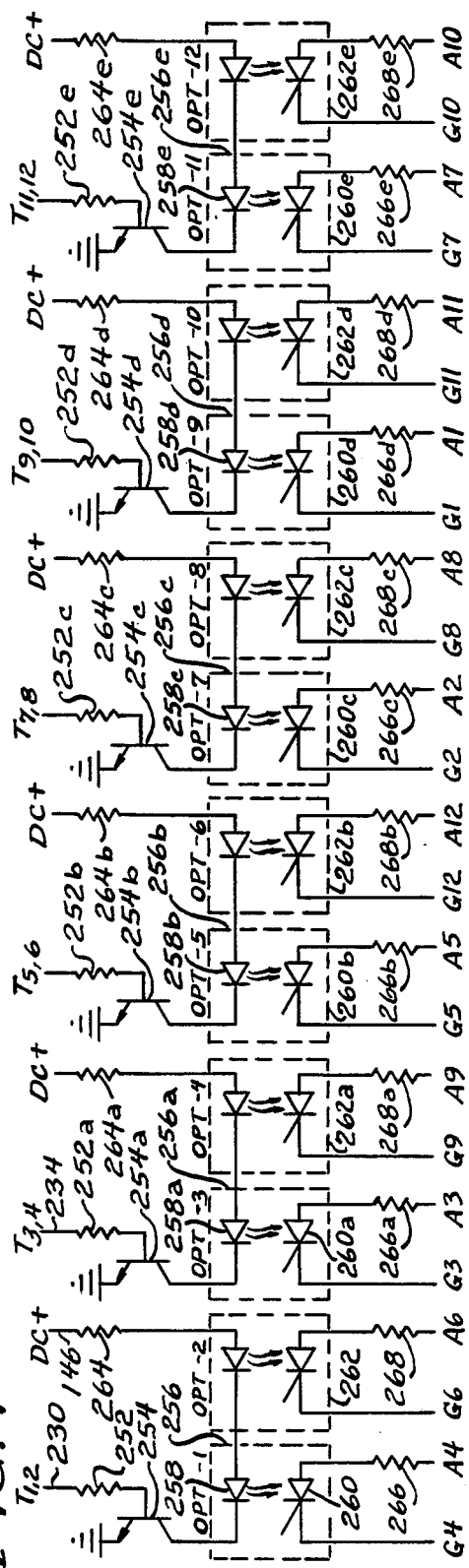
FIG.3
FIG.4

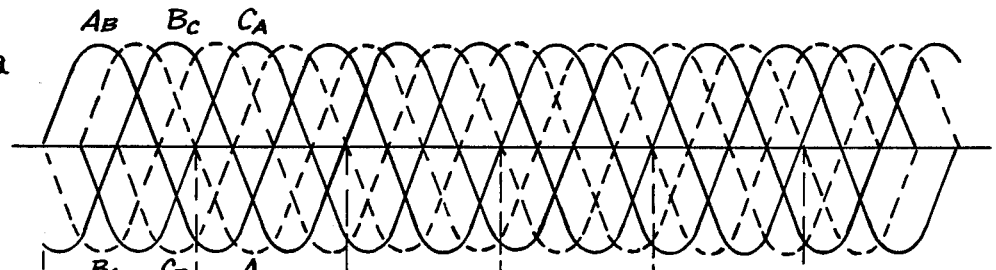
FIG.5a 60 Hz 3 PHASE INPUT WAVEFORM
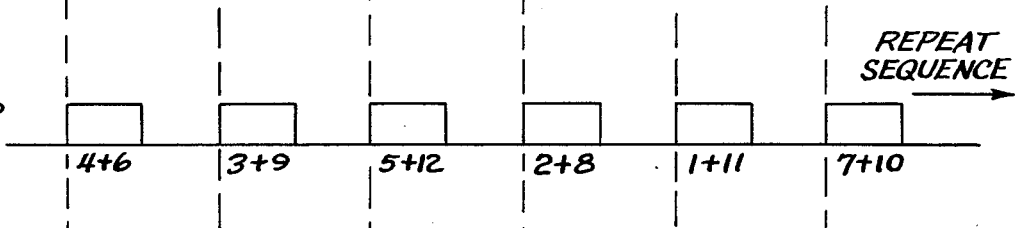
FIG.5b 15 Hz FIRING PULSE SCR#
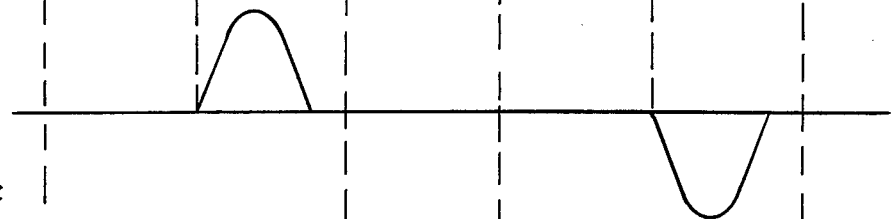
FIG.5c 15 Hz RESULTANT WAVEFORM MOTOR PHASE $L_1-L_2$
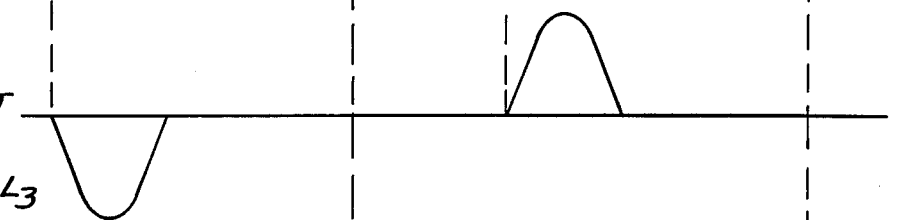
FIG.5d 15 Hz RESULTANT WAVEFORM MOTOR PHASE $L_2-L_3$
FIG.5e 15 Hz RESULTANT WAVEFORM MOTOR PHASE $L_3-L_1$ 60 Hz
3 PHASE
INPUT
WAVEFORM 20 Hz
FIRING
PULSE
SCR #

20 Hz
RESULTANT
WAVEFORM
MOTOR
PHASE $L_1-L_2$

20 Hz
RESULTANT
WAVEFORM
MOTOR
PHASE $L_2-L_3$

20 Hz
RESULTANT
WAVEFORM
MOTOR
PHASE $L_3-L_1$

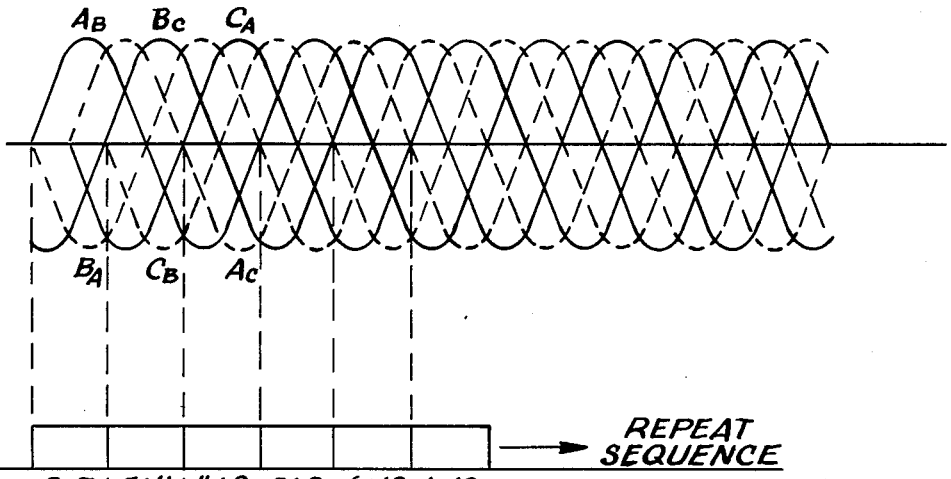
FIG. 15a
60 Hz
3 PHASE
INPUT
WAVEFORM
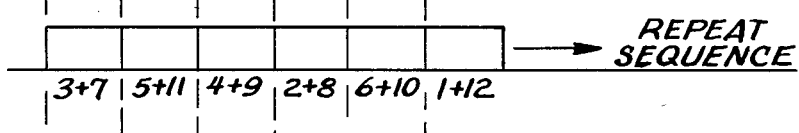
FIG. 15b
30 Hz
FIRING
PULSE
SCR #
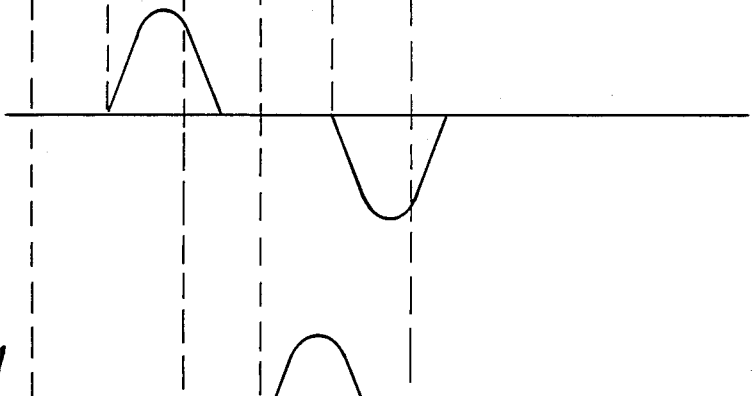
FIG. 15c
30 Hz
RESULTANT
WAVEFORM
MOTOR
PHASE $L_1-L_2$
FIG. 15d
30 Hz
RESULTANT
WAVEFORM
MOTOR
PHASE $L_2-L_3$
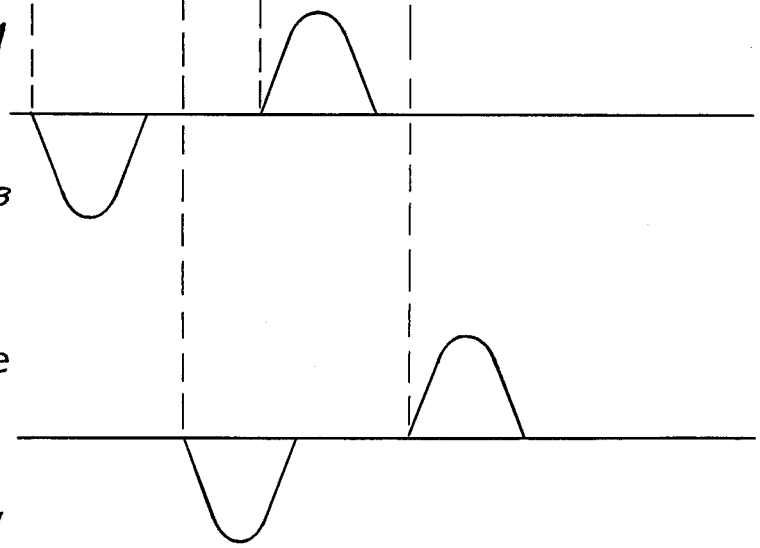
FIG. 15e
30 Hz
RESULTANT
WAVEFORM
MOTOR
PHASE $L_3-L_1$

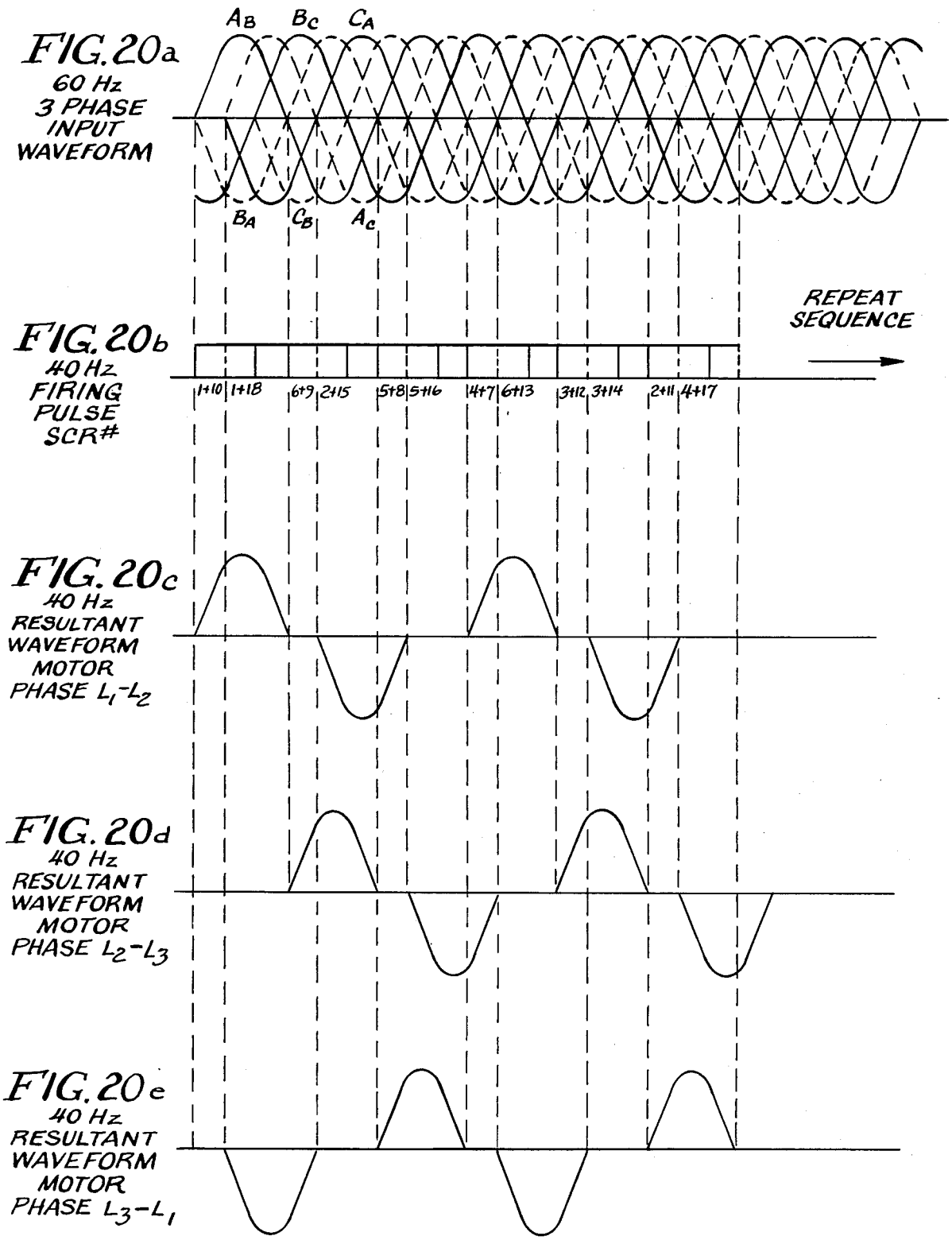

FRACTIONAL FREQUENCY CONVERTER USING ZERO SWITCHING OF INPUT FREQUENCY HALFWAVES

BACKGROUND OF THE INVENTION

Alternating current induction motors are widely used to drive many types of equipment. An alternating current induction motor of the usual type tends to be inherently a fixed speed motor with the speed related to the line frequency.

There are many occasions in which it is desirable to vary the speed of the driven machinery or equipment. In the case of belt-driven machinery, a belt sheave can often be changed to accomodate the changed speed requirement. In the case of gear or chain-driven equipment, it is often possible to change gears or sprockets to arrive at the desired speed of the driven equipment. Many times, however, the equipment must be direct driven. Even in a case of drive through belts, gears, or chains it may not be possible to change sheaves or gears, or sprockets as a necessary size may not be available commercially or the necessary size may not physically fit into the existing space. In other occasions, the mechanical solution may be cost prohibitive, due to the cost of labor or materials, or a combination of both.

One possible option is to replace the alternating current induction motor with one designed to run at a different speed, or one designed to run at various speed ranges. Sometimes a variable speed direct current motor can be substituted. Or, to make use of the A/C motor, there are commercially available solid state frequency controllers that provide a continuously variable frequency output from zero to line frequency or beyond. Although any of these solutions would work, any or all frequently are financially prohibitive for a given installation.

One common installation in which slowing the speed of an A/C induction motor is desirable, but wherein economic conditions generally prohibit the foregoing solutions is found in an oil field. A walking beam-type pumping unit is commonly operated by a three phase 1800 r.p.m (or other speed) A/C induction motor and is commonly used to withdraw oil from a well. As the oil field becomes depleted, the casing of a given pump cannot fill up from the oil field as fast as the pump tries to pump the oil from the ground. This produces a situation known as pumpdown, and unless the pump is shut down for a period of time so that the formation can "catch up", severe wear and tear will ensue on the pump parts, and energy will be consumed unnecessarily moving a pump up and down a hole without producing any oil. This situation is often accommodated by cycling the pump on and off with timers or other control devices. This is undesirable as starting and stopping of the motor and the pump causes shock loads that produce far more wear and tear on the machinery than does continuous running. It is far more desirable and more efficient to solve the pumpdown problem by slowing the pump to match the oil formation production rate, so that the oil is pumped from the well at essentially the same rate as it flows into the casing from the formation. This can sometimes be done by changing the motor sheave, but sometimes the sheave in use is the smallest that is available, and the pump cannot be slowed down simply by a change of sheaves. The economics of a commercially depleted oil field may not justify purchasing and installing a new slower speed motor, or one of the commercially available variable frequency drive systems now on the market.

Another example of the desirability of speed control is found in the heating and air conditioning industry. An air conditioning compressor must be designed to run essentially full time for the maximum load that it will encounter. However, on days when temperatures are below the maximum for which the installation is designed, overcooling may occur unless the air conditioning compressor and ventilating fans are cycled on and off. This cycling is effected with thermostatic controls, and the life of the equipment is reduced, and energy costs are increased through this inefficient mode of operation. Futhermore, the resultant cycling of temperature can be uncomfortable and is undesirable. A preferred mode of operation would be to slow the compressor and/or fan so that the BTU output of the air conditioning system would more closely match the heat loss characteristics of the building in which it is installed. With technology now available, it is possible for these motors to be run at substantially any speed from zero to full rated r.p.m. The problem lies in that the equipment available is high priced and economically unfeasible, and the motors continue to be cycled on and off in an inefficient manner.

OBJECTS AND SUMMARY OF THE PRESENT INVENTION

The primary object of the present invention is to provide a frequency changing circuit for controlling the speed of an A/C induction motor that is of low-cost and which is economically feasible in installations in which previous apparatus have been unfeasible.

More particularly, it is an object of this invention to provide a network of solid state components the firing of which is controlled to produce submultiples of A/C line frequency for controlling the speed of an A/C induction motor.

More particularly, it is an object of the present invention to produce a frequency reduction circuit to be connected between a three phase power source and a three phase A/C induction motor utilizing power SCRs which are fired as the input line voltage crosses zero and which uses natural commutation to turn off the SCRs.

In achieving the foregoing and other objects of the present invention, I provide a circuit of SCRs connected in series between a three phase alternating current power source and a three phase alternating current induction motor. The SCRs are fired in such a sequence as to produce a new wave form that is a fraction of the original line frequency. The power SCRs are always fired as the input line voltage crosses zero and uses natural commutation to turn off the SCRs. This allows the use of lower cost "phase control" SCRs rather than the more expensive "switching type" SCRs. Solid state logic and trigger circuits are connected in various configurations so that the speed can be selected that best suits the application. Output frequencies of 15 Hz., 20 Hz., 30 Hz. or 40 Hz. are readily attained by the present invention from a 60 Hz. source. A triggering logic includes a plurality of J-K flip-flops arranged in a ring counter circuit and firing the SCRs through transistors and opto-isolators.

In controlling the power input of an A/C induction motor, a reduction in the frequency of the applied power also necessitates a reduction in the effective value of the voltage wave form. This is due to the fact that motor impedence decreases with a corresponding frequency reduction. The present invention accommodates nicely by simply deleting unwanted components of the input voltage wave form to perform both tasks of changing the frequency and the effective voltage at the same time. As will be more clear hereinafter, when the output frequency is one-half the input frequency (for example), the actual number of half period segments comprising the output wave form is equal to one-half the number of half period segments comprising the input wave form. This does not result in a peak voltage change, but it does result in an effective voltage reduction of approximately 50% when output voltage is compared to input voltage. Corresponding voltage reductions occur at other output frequencies.

THE DRAWINGS

The present invention will best be understood with reference to the following specification when taken in connection with the accompanying drawings wherein:

FIG. 3 is an electrical schematic diagram of the J-K flipflops used to effect the triggering of the SCRs;

FIG. 4 is a schematic wiring diagram of the triggering transistors and opto-isolators connecting the triggering J-K flipflops to the SCRs FIG. 5a illustrates the input three phase A/C wave form;

FIG. 5b illustrates the firing pulses to the SCRs to produce a 15 Hz. frequency to the motor;

FIGS. 5c, 5d and 5e illustrate the resultant wave form to the three motor phases;

Figure 10A:
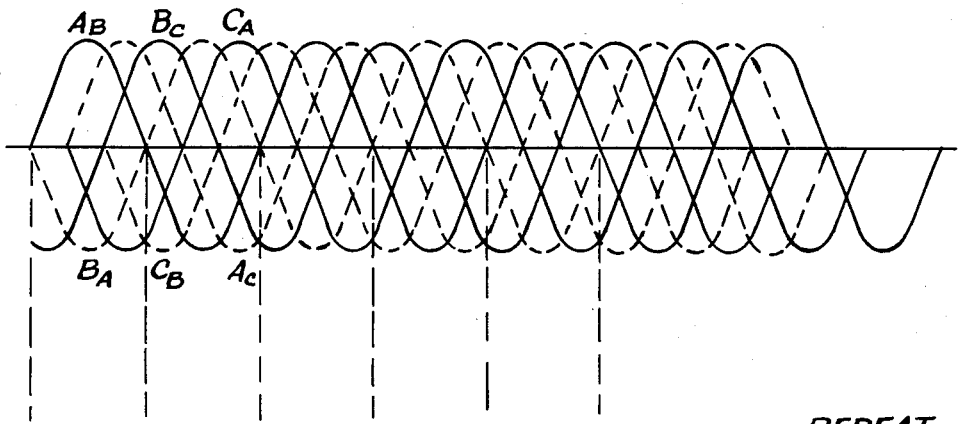
Figure 10B:
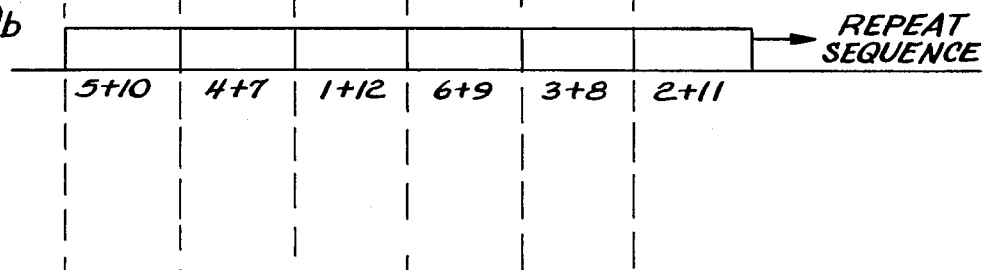
Figure 10C:
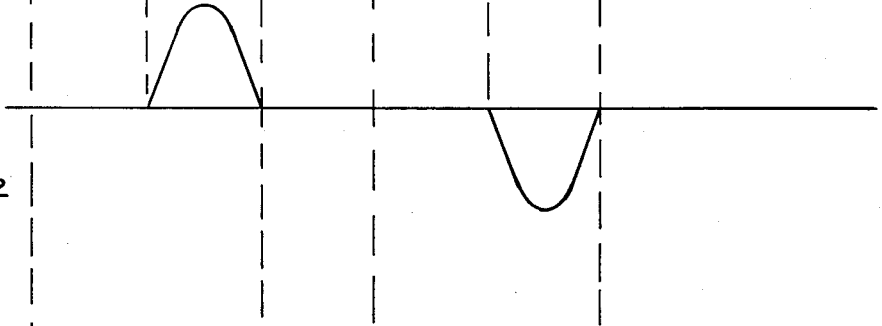
Figure 10D:
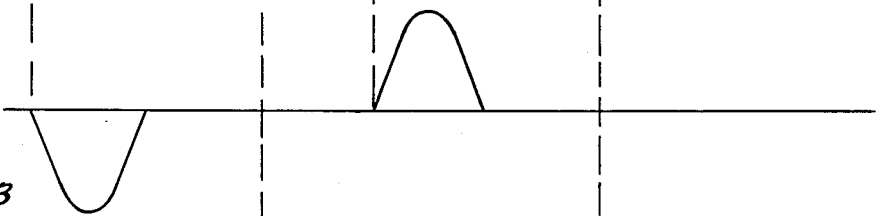
Figure 10E:
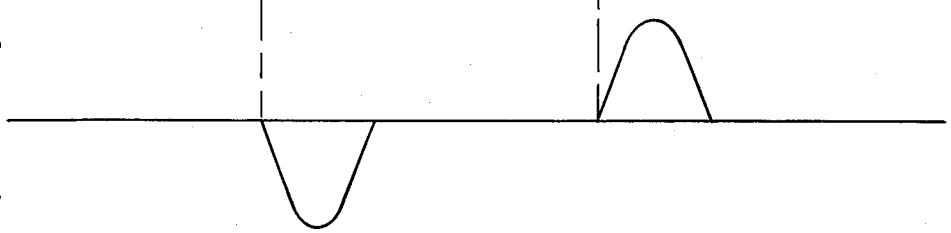

FIGS. 10a-10b respectively correspond to FIGS. 5a-5e for 20 Hz.

Figure 1:
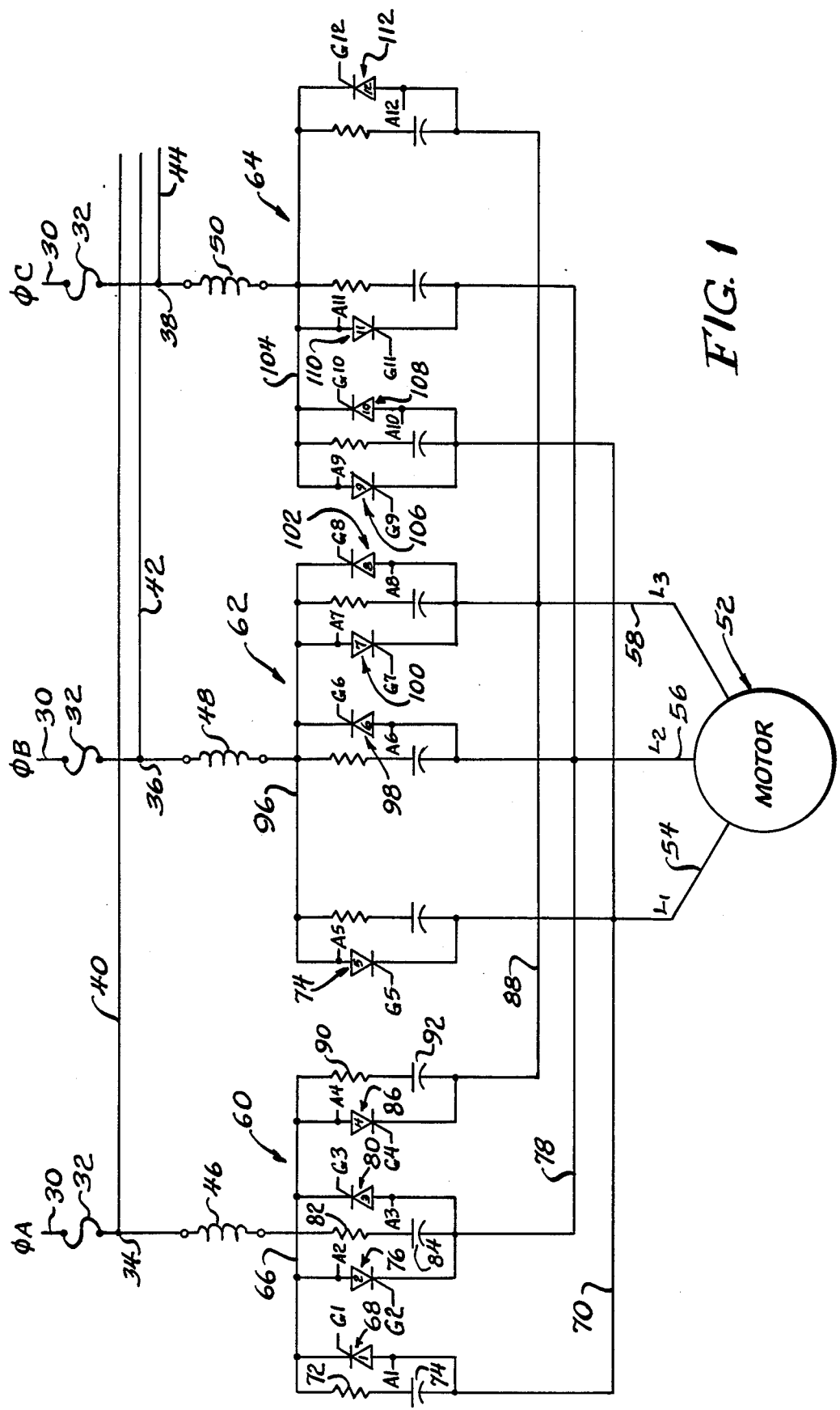
FIG. 1 is a schematic wiring diagram of the input line, the three phase induction motor, and the SCRs used for frequency reduction.
Figure 2:
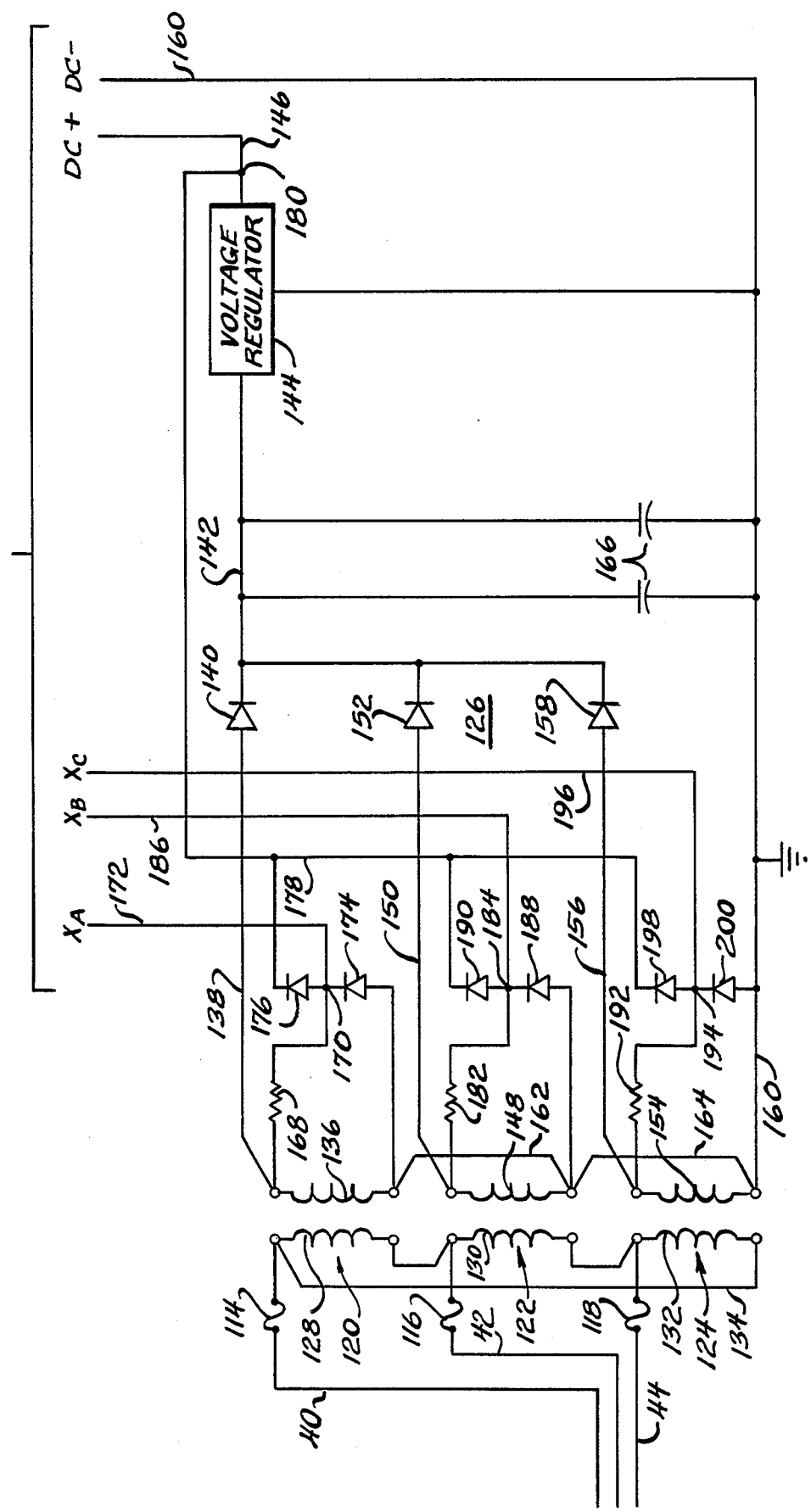
FIG. 2 is an electrical wiring diagram of the pulse generator and D.C. power supply forming a part of the present invention.
Figure 11:
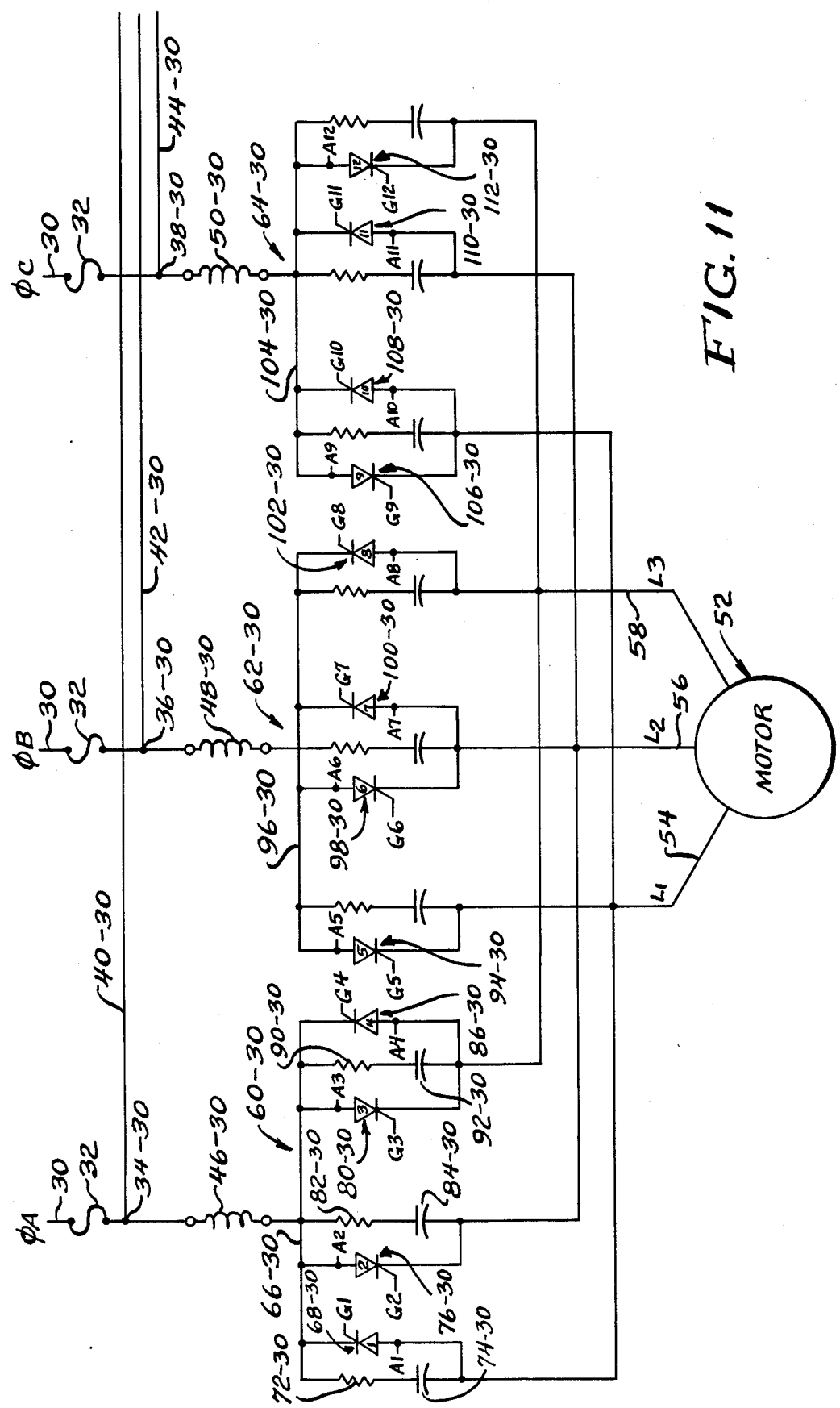
Figure 12:
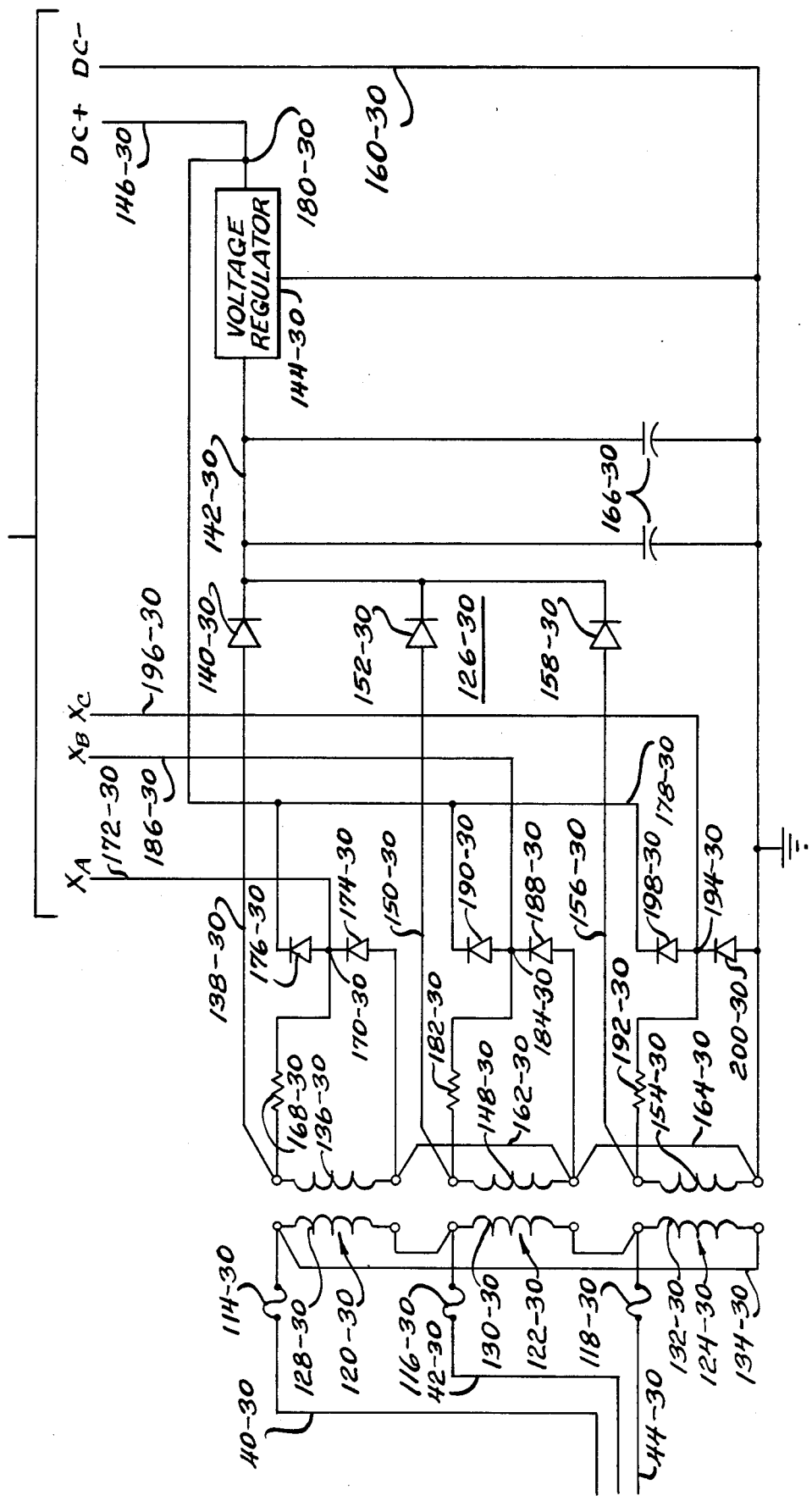

FIG. 11 corresponds to FIG. 1 for developing a 30 Hz. frequency;

FIG. 12 corresponds to FIG. 2 for 30 Hz.

Figure 13:
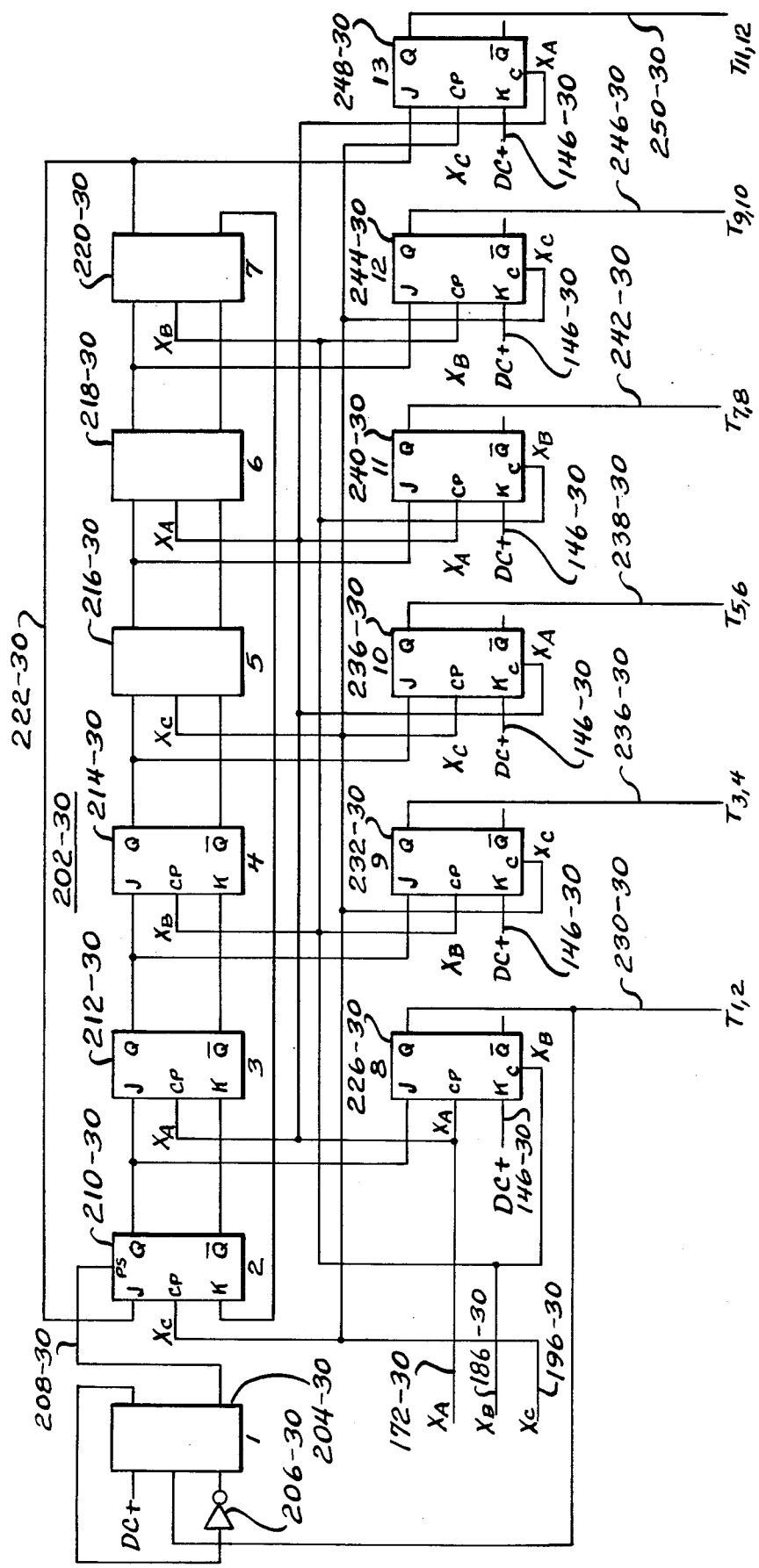

FIG. 13 corresponds to FIG. 3 for 30 Hz.

Figure 14:
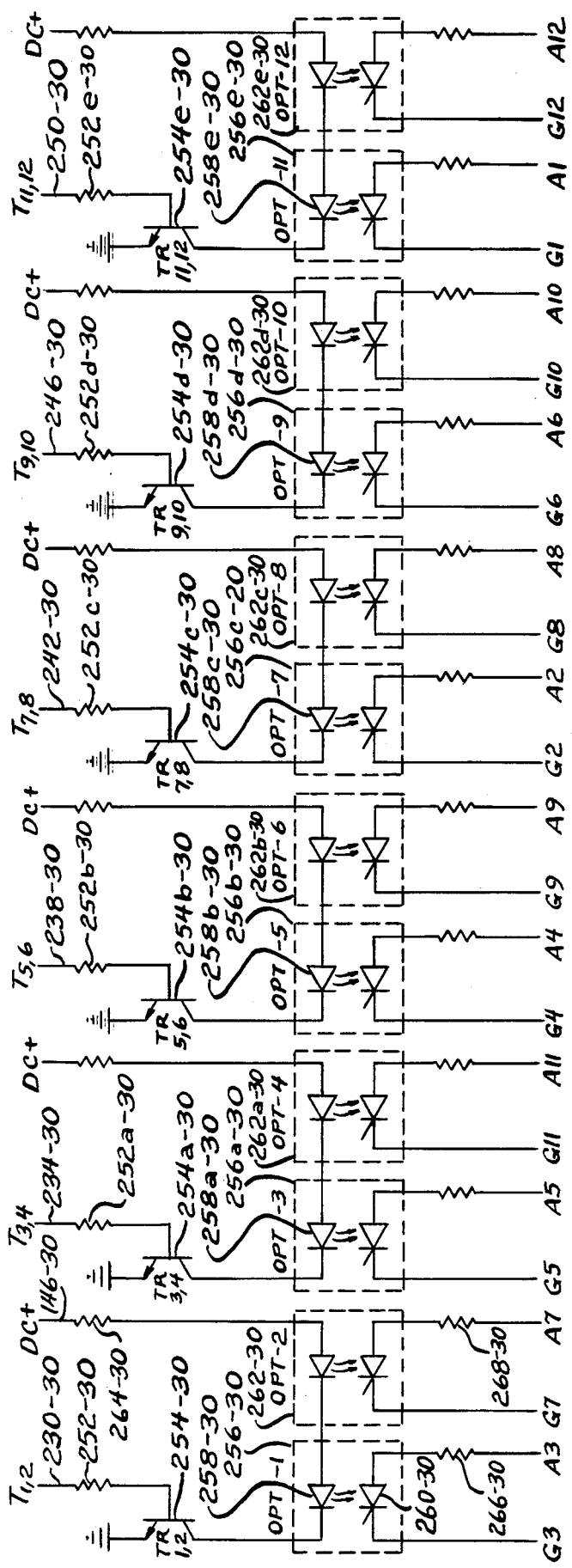

FIG. 14 corresponds to FIG. 4 for 30 Hz.

FIGS. 15a-15e respectively correspond to FIGS. 5a-5e for 30 Hz.

Figure 16:
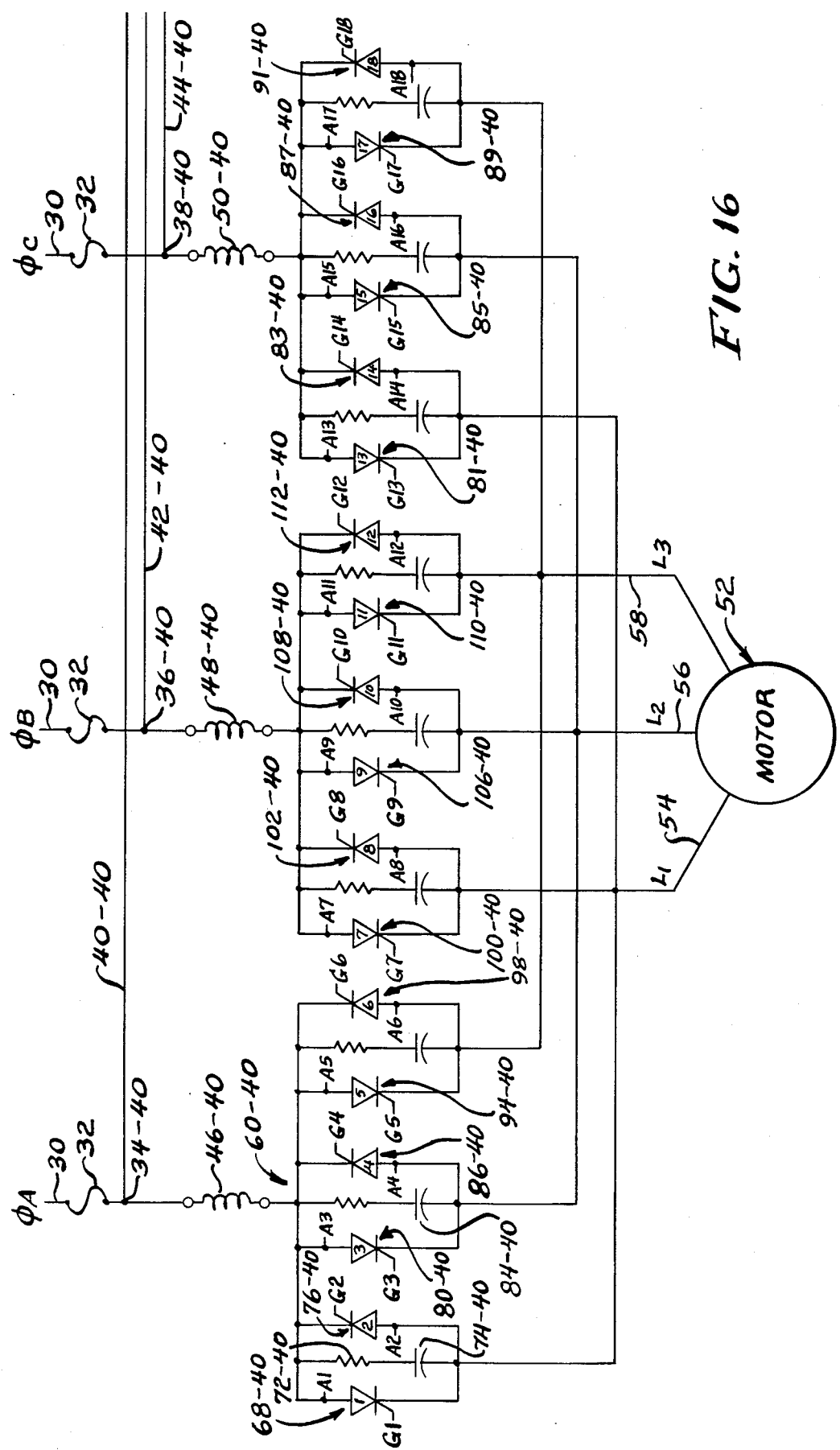
Figure 17:
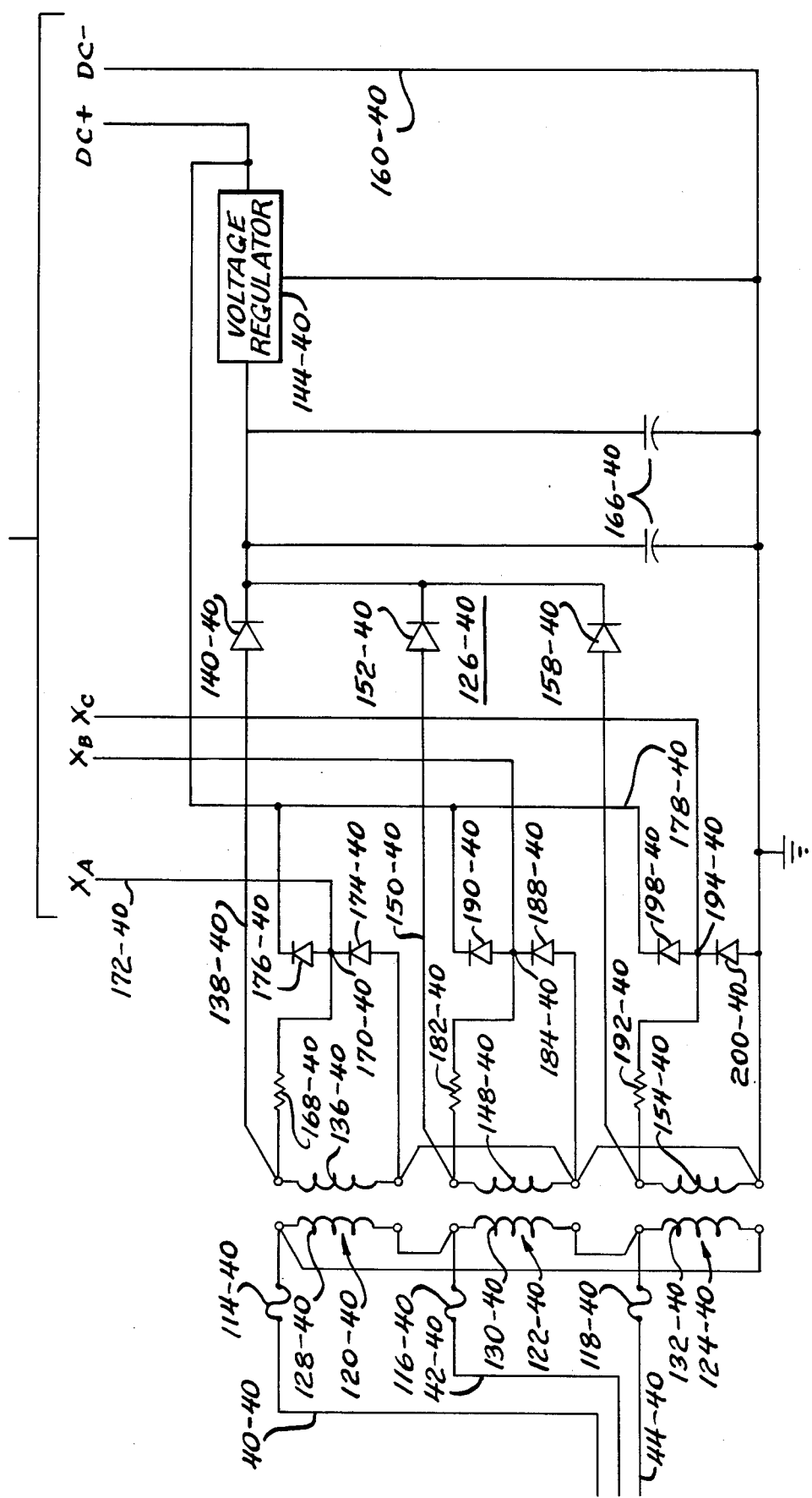
Figure 18:
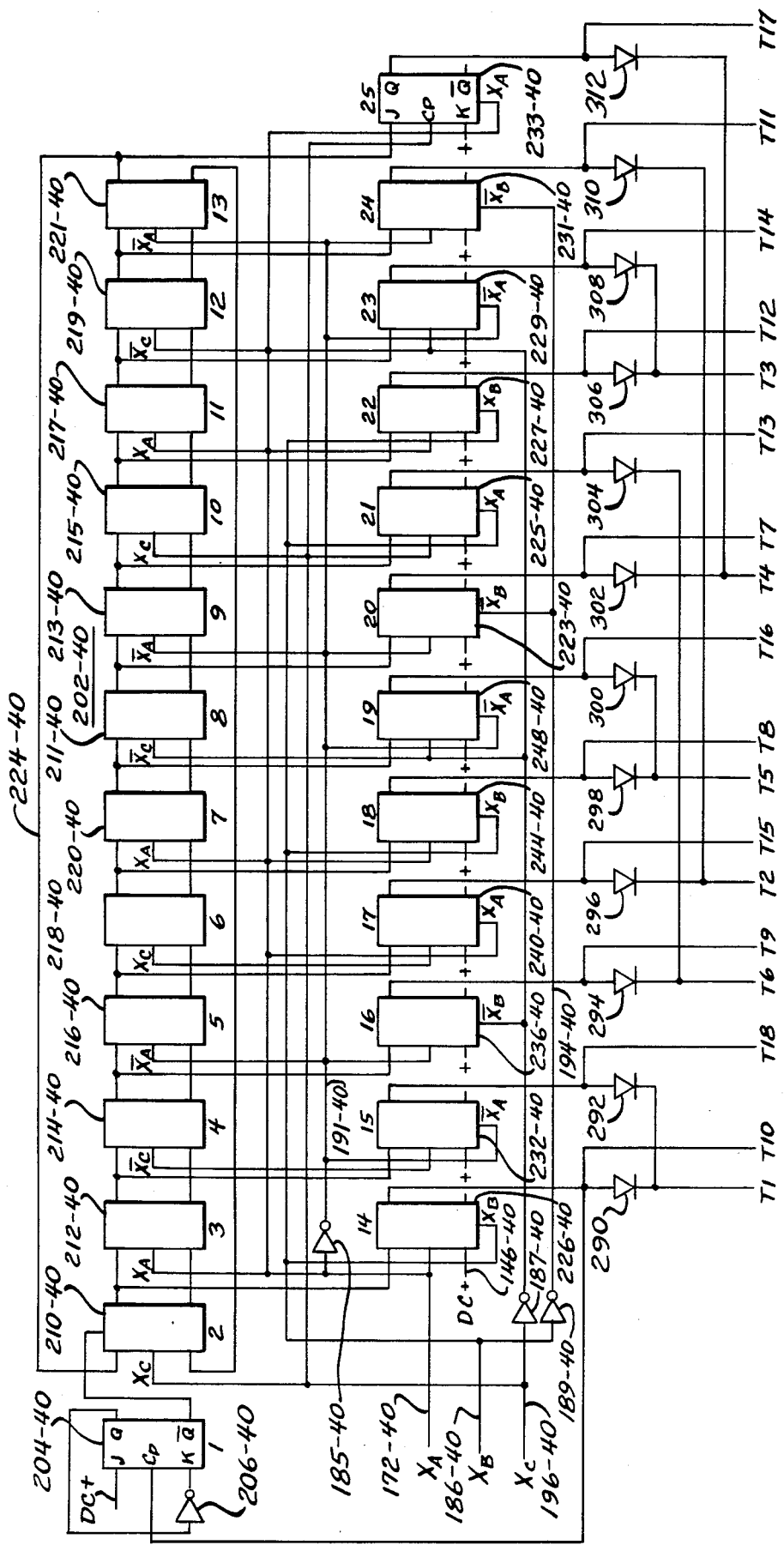
Figure 19:
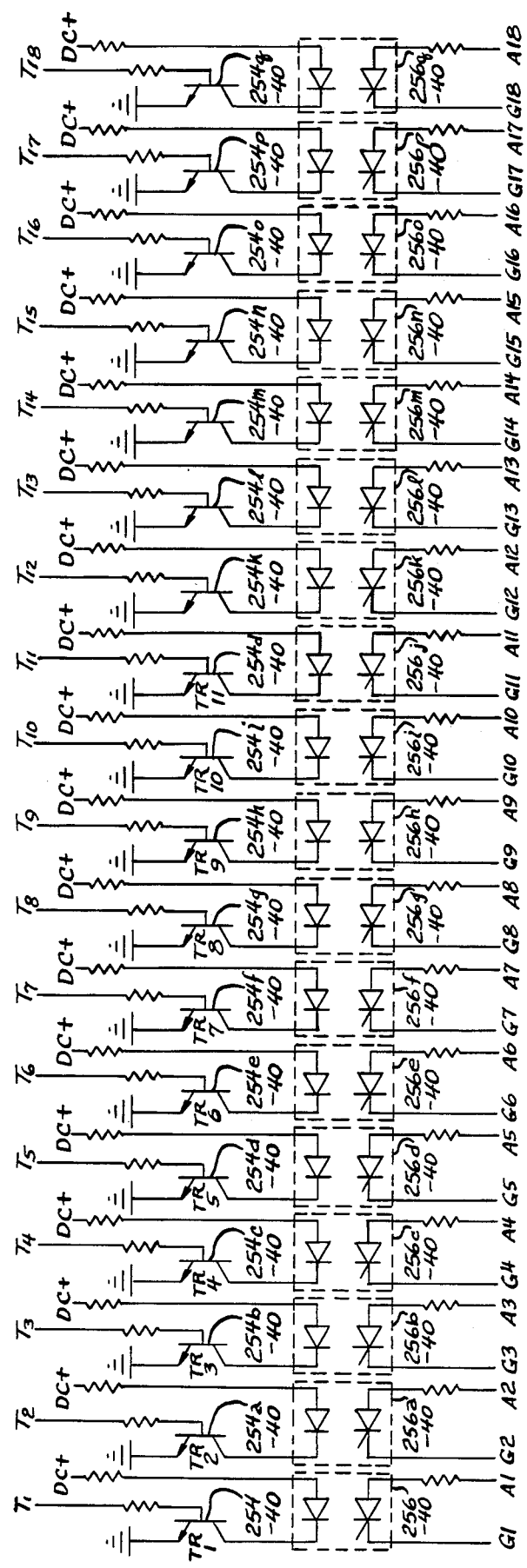

FIG. 16 corresponds to FIG. 1 for developing a 40 Hz. output frequency;

FIG. 17 corresponds to FIG. 2 for 40 Hz. ;

FIG. 18 corresponds to FIG. 3 for 40 Hz.;

FIG. 19 corresponds to FIG. 4 for 40 Hz. and;

FIGS. 20a-20e respectively corresponds to FIGS. 5a-5e for 40 Hz.

DETAILED DESCRIPTION OF THE ILLUSTRATED EMBODIMENTS

In FIG. 1 there is shown a three phase A/C supply line respectively having the three phases thereof labeled φA, φB and φC. Each phase is provided with a fuse or circuit breaker 32, with a respective junction 34, 36, and 38 from which connecting lines 40, 42 and 44 respectively lead to other components shown in FIG. 2 and to be referred to shortly hereinafter. Each phase has a series inductance 46, 48 and 50 respectively, connected to the respective junctions 34, 36 and 38 to protect against current spikes, often referred to as di/dt.

A three phase motor 52 is provided with three leads 54, 56, and 58, respectively labeled as L1, L2 and L3.

Each of the conductors 46, 48 and 50 is connected selectively to the motor 52, and back to a proper inductor or phase through a network 60, 62 or 64. The networks are the same except for external connections, and the network 60 will be described as illustrative.

The network 60 includes a buss or common line 66 connected to the opposite end of the conductor 46 from the junction 34. The cathode of a silicon controlled rectifier 68 is connected to the line 66, while the anode thereof is connected to a line 70 which is connected to lead one 54 of the motor 52. The gate of the SCR (silicon controlled rectifier) is labeled as G1, while the anode is labeled as A1 for connection to switching devices to be discussed with regard to FIG. 4. The SCR 68 is paralleled by a series connected resistor 72 and capacitor 74 for protection against voltage spikes, otherwise referred to as dv/dt. SCR number 2 is indicated at 76, having the anode connected to the line 66 and the cathode to a line 78 which is connected to lead two 56 of the motor 52. The anode of SCR 76 is indicated at A2, while the gate is indicated at G2, these being for connections to the trigger circuit of FIG. 4. The third SCR 80 is connected in parallel to, but reversely polarized with reference to SCR number 2. The anode A3 is connected to the line 78 while the cathode is connected to the line 66, the gate being indicated at G3. The SCRs 76 and 80 are paralleled by a series connected resistor 82 and capacitor 84.

The network 60 is completed by the fourth SCR 86 which has the anode A4 thereof connected to the line 66, and the cathode thereof connected to a line 88 which leads to L3, the third motor lead 58. The gate for the SCR 86 is indicated at G4. A series connected resistor 90 and capacitor 92 parallel the SCR 86, again to guard against voltage spikes.

The second and third SCR networks 62 and 64 are similar to the network 60, and will be set forth only in abbreviated fashion since the connections are clear from FIG. 1 of the drawings. The fifth SCR 94 has the cathode thereof connected to the line 96 which is in turn connected to the end of the inductor 48 opposite to the junction 36. The cathode of the SCR 94 is connected to the line 70, the controls for the anode and gate being indicated at A5 and G5. This SCR again is paralleled by a resistor-capacitor series combination to guard against voltage spikes.

The sixth SCR 98 has the cathode thereof connected to the line 78 and the anode to the line 96, the anode and gate control connections being indicated, and the SCR being paralleled by a resistor-capacitor series combination.

The seventh SCR 100 has the cathode thereof connected to the line 96 and the anode to the line 88, the control connections being indicated in the same manner as heretofore. The eighth SCR 102 is connected in parallel to the SCR 100, but of reverse polarity, the cathode being connected to the line 96 and the anode to the line 88. A single resistor-capacitor series connection combination parallels both the SCRs 100 and 102.

The third network 64 includes a common line or buss 104 connected to the end on inductor 50 opposite to the junction 38. The ninth SCR 106 has its anode conected to the line 104 and the cathode connected to the line 70. The control connections to the anode and to the gate are respectively indicated at A9 and G9 as before. The tenth SCR 108 is connected in parallel to, but of opposite polarity, to the SCR 106, having the cathode connected to the line 104, and the anode connected to the line 70. The anode and gate control connections are indicated at A10 and G10 respectively. The two SCRs 106 and 108 are paralleled by a single series combination resistor and capacitor. The eleventh SCR 110 has an anode connected to the line 104 and the cathode connected to the line 78. The anode and gate control connections are respectively indicated at A11 and G11. The SCR 110 is paralleled by a series resistor-capacitor combination.

The twelfth SCR 112 has its anode connected to the line 88 and its cathode to the line 104. The anode and gate control connections are respectively indicated at A12 and G12. The SCR 112 is paralleled by a series resistor-capacitor combination.

The three networks 60, 62 and 64 constitute a power SCR bridge assembly.

The wires 40, 42 and 44 continue from the right side of FIG. 1 to the left side of FIG. 2, and respectively are connected through fuses or circuit breakers 114, 116 and 118 to the input connections of three transformers 120, 122 and 124. The transformers are of rather small size and are utilized in a pulse generator and D/C power supply 126. The line 40 is connected through the fuse 114 to one input connection of the primary winding 128 of the transformer 120. The opposite end of this primary winding is connected to the fuse 116 on the opposite side thereof from the line 42, and also to one end of the input winding 130 of the transformer 122. The other end of the input winding is connected to the end of the fuse 118 opposite the line 44, and also to one input of the primary winding 132 of the transformer 124. The opposite end of the primary winding 132 is connected by a line 134 back to the top end of the input winding 128 and to the line 40 through the fuse 114.

The top end of the output winding 136 of the transformer 128 is connected by a wire 138 to the anode of a diode rectifier 140, the cathode being connected by a wire 142 to a voltage regulator 144. The output of the voltage regulator on line 146 comprises a D/C voltage for various solid state components to be noted hereinafter.

The top end of the secondary winding 148 of the transformer 122 is connected by means of a line 150 to the anode of a diode rectifier 152, the cathode of which is connected to the line 142. The top end of the secondary winding 154 of the transformer 124 is connected by a line 156 to the anode of a diode rectifier 158, the cathode of which is connected to the line 142. The bottom end of the secondary winding 154 is connected to a D/C ground line 160. The lower terminal of the output winding 136 of the transformer 120 is connected by a wire 162 to the lower end of the output winding 148 of the transformer 122, and this in turn is connected by a wire 164 to the D/C ground line 160. A pair of smoothing capacitors 166 is connected in parallel between the line 142 and a D/C ground line 160 to smooth the voltage applied to the voltage regulator 144.

The transformers, the diodes 140, 142 and 158 along with the capacitors 166 and the voltage regulator 144 will be recognized as constituting a three phase to D/C rectifier.

Additional connections are made to the transformer secondaries. Thus, to the top of the secondary 136 there is connected a resistor 168 leading to a junction 170 and on to an output line 172 labeled as XA. The lower end of the transformer secondary 136 leads to the anode of a diode 174, the cathode of which is connected to the junction 170. The junction also is connected to the anode of a diode 176, the cathode of which is connected to a buss 178 leading to a junction 180 on the D/C+ output line 146.

The top end of the output winding 148 is connected through a resistor 182 to a junction 184 which has an output line 186, labeled XB. The lower end of the output winding 148 is connected to the anode of a diode 188, the cathode being connected to the junction 184. The junction 184 is connected to the anode of the diode 190, the cathode of which is connected to the buss 178.

The top end of the transformer output winding 154 is connected through a resistor 192 to a junction 194 leading to an output line 196 labeled XC. The junction also is connected to the anode of a diode 198 leading to the buss 178. The lower end of the transformer output winding 154 is connected to the anode of the diode 200, the cathode of which is connected to the junction 194.

From the foregoing, each of the lines XA, XB, and XC is provided with a timing pulse starting at the positive going zero crossing of the respective transformer secondary output wave. The pulse is clipped so that it does not exceed the D/C power supply voltage. These pulses are subsequently used as triggering and clock pulses for triggering an array of flip-flops shortly to be desribed.

Sequencing logic 202 is shown in FIG. 3 and comprises an array of J-K flip-flops. There is a total of thirteen such flip-flops, and numerals 1–13 are applied respectively to the flip-flops. Flip-flop number one is identified at 204. The Q output thereof is connected through an inverter 206 to the K input. The Not Q output is connected by a line 208 to the PS input of flip-flop number 2 identified at 210. Flip-flops 2 through 7 are connected in a ring counter arrangement. Specifically, the Q and Not Q outputs of the flip-flop 210 are connected to the third flip-flop 212 inputs J and K, respectively. The Q and Not Q outputs of flip-flop 212 are connected to the fourth flip-flop 214 J and K inputs, respectively. The Q and Not Q outputs of flip-flop 214 are connected to the J and K inputs of the fifth flip-flop 216, respectively. The Q and Not Q outputs of flip-flop 216 are connected to the sixth flip-flop 218 J and K inputs respectively, and the Q and Not Q outputs of this flip-flop are connected respectively to the J and K inputs of the seventh flip-flop 220. The Q output of the seventh flip-flop 220 is connected at 222 back to the J input of number two flip-flop 210, while the Not Q output of number seven flip-flop number 220 is connected at 224 back to the K input of number two flip-flop 210, thus completing the ring counter array.

The clock pulse inputs to the J-K flip-flops 210, 212, 214, 216, 218 and 220 are supplied from the XA line 172 the XB line 186, and the XC line 196. Specifically, the clock pulse input for flip-flops 210 and 216 are supplied from the XC line 196. The clock pulses to the flip-flops 212 and 218 are supplied from the XB line 186, while the clock pulses to the flip-flops 214 and 220 are provided by the XA line 172.

Flip-flop number eight indicated at 226 has the J input thereof connected to the Q output of the flip-flop 210. The K input is connected to the DC+ on line 146.

The clock pulse input is connected to the XA line 172, and the clear input is connected to the XB line 186. The Q output of the number eight flip-flop 226 is connected by a line 228 to the clock pulse input of the number one flip-flop 204. The Q output also is connected to a line 230 indicated as T1,2. The Not Q output is not connected.

J-K flip-flops 9–13 are connected in analogous fashion. Flip-flop number nine indicated at 232 has the J input thereof connected to the Q output of flip-flop 212. The clock pulse input is provided by the XC line 196, while the clear input is supplied by the XA line 172. All of the flip-flops numbers 9–13 have the K input connected to the D/C line 146. None of these flip-flops has the Not Q output connected. The Q output of the number nine flip-flop 232 is connected to a line 234 labeled T3,4. Number 10 flip-flop 236 has the J input connected to the Q output of flip-flop 214. The clear input is connected to the XC line 196. The Q output is connected to a line 238 labeled as T5,6.

The eleventh flip-flop 240 has the J input connected to the Q output of flip-flop 216, and the C input to the XB line 186. The Q output is connected to a line 242 labeled as T7,8.

The number twelve flip-flop 244 has the J input thereof connected to the Q output of flip-flop 218 and the C input connected to the XA line 172. The Q output is connected to the T9,10 line 246.

The thirteenth and last flip-flop 248 has the J input connected to the Q output of flip-flop 220 and the C input connected to the XC line 196. The Q output is connected to the T11,12 line 250.

Turning now to FIG. 4, the T1,2 line 230 will be seen at the upper left corner connected through a series resistor 252 to the base of an n-p-n transistor 254, also labeled TR 1,2. The collector of this transistor is connected to the cathode input lead of an opto-isolator 256.

The opto-isolator is a commercially-available device, sometimes known as a photon coupled isolator. It includes a light-emitting diode 258 and an adjacent light gated SCR (silicon controlled rectifier) 260. Emission of light by the diode 258 turns on the SCR 260, the outer housing of which is opaque to avoid interference from outside light.

The opto-isolator, also labeled OPT-1, has the cathode lead of the LED (light emitting diode) 258 connected to the emitter of the transistor 254, as indicated earlier. The anode lead is connected to the cathode lead of adjacent OPT-2 opto-isolator 262, the anode lead of which is connected through a resistor 264 to the DC potential on-line 146. The anode lead of the opto-isolator SCR 260 is connected through a resistor 266 to connection A4, while the cathode lead of the SCR is connected directly to lead G4. Similarly, the anode of the SCR of opto-isolator 262 is connected through a resistor 268 to lead A6, while the cathode of this SCR is connected to lead G6.

Whenever the transistor 254 is turned on, the LEDs of the opto-isolators 258 and 262 will emit light and turn on the corresponding SCRs. Turning on of these SCRs connects lead A4 to lead G4, and lead A6 to lead G6. The leads refer to those indicated at the anode and gate of the respective SCRs in FIG. 1, whereby the anode and gate of SCR 86 are connected, and the anode and gate of SCR 98 are connected, thereby turning on these two SCRs.

The suffix 1,2 has been applied to the designation for the line 230 and for the transistor 254 since the potential on this line and conduction of the transistor controls the conduction of both opto-isolators 256 and 262.

There are five additional leads T3,4, etc. and correspondingly five pairs of opto-isolators OPT-3 and OPT-4, etc. To avoid proxility of description, duplicative devices are identified by like numbers with the addition of the suffix a through e respectively. The gates and anodes of the various SCRs of FIG. 1 are connected when the respective opto-isolators are turned on, such as G3, A3 and G9, A9, etc.

The circuits heretofore described are for obtaining a 15 Hz. frequency from a 60 Hz. power supply with a phase A-B-C rotation. The timing of the input wave along with the pulses for turning on the SCRs and the resulting output waves are shown in FIGS. 5a through 5e. More specifically with reference to FIG. 5a, the input wave forms for AB, BC and CA are shown in solid lines; the respective inverse wave forms BA, CB and AC are shown in broken lines.

Each positive going wave form provides a pulse on the respective lines Xa, Xb and Xc in FIG. 2, and these pulses act with the sequencing logic of FIG. 3 and the trigger circuit of FIG. 4 to turn on the SCRs of FIG. 1 in a controlled sequence. With reference to FIG. 3, when power is turned on, all of the flip-flops are in a low state. The first flip-flop 204 has its Not Q output connected to the preset terminal of the second flip-flop 210, and this causes the flip-flop 210 to set or go high. This, in turn, provides a high output to the J terminal of the eighth flip-flop 226, thereby qualifying this flip-flop to go high as soon as it is clocked by XA on the clock pulse input. When the XA clock pulse is received, flip-flop 226 goes high and the positive Q output thereof on line 230 turns on the transistor 252 (FIG. 4). This, in turn, produces conduction in opto-isolators 256 and 262, thereby providing gate current for power SCRs number 4 and 6, 86 and 98 respectively. This produces current in a forward direction from phase A through SCR 86, through motor lead L3 into the motor stator windings and out through motor lead L2, and then through SCR 98 back to phase B. This current continues for one half cycle until the voltage falls to zero, at which time the SCRs are naturally commutated to the nonconducting mode. Since conduction as just explained was through motor lead L3 and out to motor lead L2, this is a negative half wave when considering the direction of L2 to L3, and this appears at the left margin of FIG. 5d.

As the eighth flip-flop 226 goes high, its output is also used to clock the first flip-flop 204 into the high mode. The invertor 206 causes the flip-flop 204 to lock into a high mode and to stay there as long as power is applied to the circuit. Each time that power is removed and replaced will cause the flip-flop 204 to lock into the high mode as just set forth.

A XB pulse on line 186 is received 120 electrical degrees after pulse XA and clocks the third flip-flop 212 which goes high. This same XB pulse is supplied to the clear input of the eighth flip-flop 226 which is thereby cleared and turns off the gate current to numbers 4 and 6 SCRs, 86 and 98, respectively. The high output on the third flip-flop 212 qualifies the ninth flip-flop 232, and this latter flip-flop goes high 120 electrical degrees afterwards when it is clocked by pulse XC. A high putput from the ninth flip-flop 232 places a high on line 234 and turns on transistor 254a, thereby rendering opto-isolating devices 256a and 262a conductive, thereby applying gate current to power SCRs 3 and 9, 80 and 106, respectively. Current then flows from phase 3 through SCR 106 into motor lead L1, through the stator windings, and out motor lead L2 and through SCR 80 and back to phase A. This produces the first positive going wave shown in FIG. 5c, the SCR firing pulses being shown in 5b.

Pulse XA clears the ninth flip-flop 232 and clocks the fourth flip-flop 214, and this in turn qualifies the tenth flip-flop 236 to go high when the XB pulse appears 120 electrical degrees later. As can be seen in the drawings, this process continues throughout the logic sequence, firing SCRs at the proper time to produce the desired wave forms. As the seventh flip-flop 220 goes high, it qualifies the second flip-flop 210 to go high on the next clock pulse, comprising an XC pulse, and the sequence is repeated again. This repetition continues until power is removed from the circuit.

The result of this is a set of three, evenly spaced, balanced, segmented wave forms, repeating with a frequency of 15 Hz. As noted earlier, the voltage should be reduced along with the frequency. As will be seen in FIGS. 5a and 5c through 5e, the peak of each wave form remains the same, but there is only one-fourth the number of waves whereby the total effective voltage is reduced to approximately one quarter.

Figure 6:
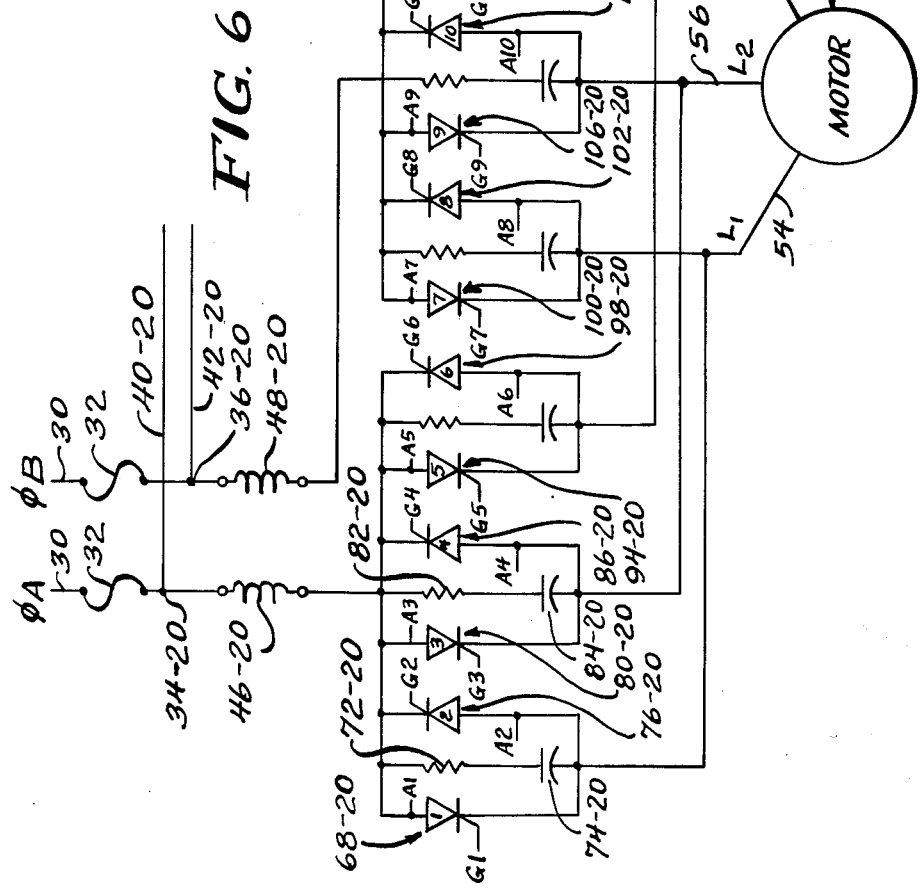
FIG. 6 is a view similar to FIG. 1 for producing a 20 Hz. frequency.

As noted heretofore, the circuits of FIGS. 1–4 and wave forms of FIGS. 5a–5e produce a three phase 15 Hz. wave form from a three phase 60 Hz. wave form. Similar circuits and wave forms for deriving a 20 Hz. three phase wave form are shown in FIGS. 6–9 and 10a–10e. Most of the parts are the same or similar, but with slightly different connections. To avoid prolixity of discussion, similar parts are identified with the same number with the addition of the suffix 20. In FIG. 6 it will be seen that only two phases, phases A and B, are used to provide the three output phases to the motor leads 54, 56 and 58. It will thus be seen that the 20 Hz. conversion besides converting frequency is also a single phase to three phase converter. The input is single phase, 60 Hz. A/C while the output is balanced, three phase, 20 Hz. A/C.

Figure 7:
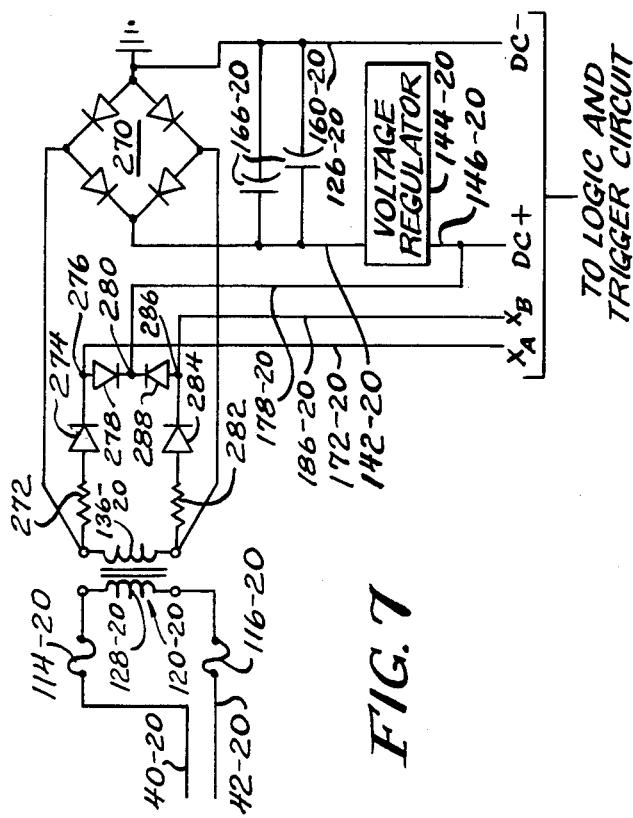
FIG. 7 is a view similar to FIG. 2 for 20 Hz.

Because of the single phase input, the D/C power supply and pulse clipping circuitry shown in FIG. 7 are considerably simplified. Only a single control transformer 120-20 is required rather than the three transformer arrangement contained in the power supplies of the 15 Hz. frequency heretofore disclosed, and the 30 and 40 Hz. frequencies subsequently to be disclosed. The top end of the transformer output winding 136-20 is connected to one corner of a conventional bridge rectifier circuit 270, the opposite corner being connected back to the lower terminal of the putput winding 136-20. The D/C output terminals are, as usual, arranged at right angles to the terminals to which the transformer winding is connected.

In addition, the top end of the transformer output winding 136-20 is connected through a resistor 272 to the anode of a diode 274, the cathode of which is connected to a junction 276. This junction leads to the XA output line 172-20. The junction 276 also is connected to the anode of a diode 278, the cathode of which is connected to a junction 280. This junction is connected through a conductor 178-20 to the D/C output line 146-20.

The lower end of the transformer secondary winding 136-20 is connected through a resistor 282 to the anode of a diode 284 The anode is connected to a junction 286, and the junction is connected to the XB line 186-20. The junction 286 also is connected to the anode of a diode 288, the cathode of which is connected to the previously-mentioned junction 280.

Figure 8:
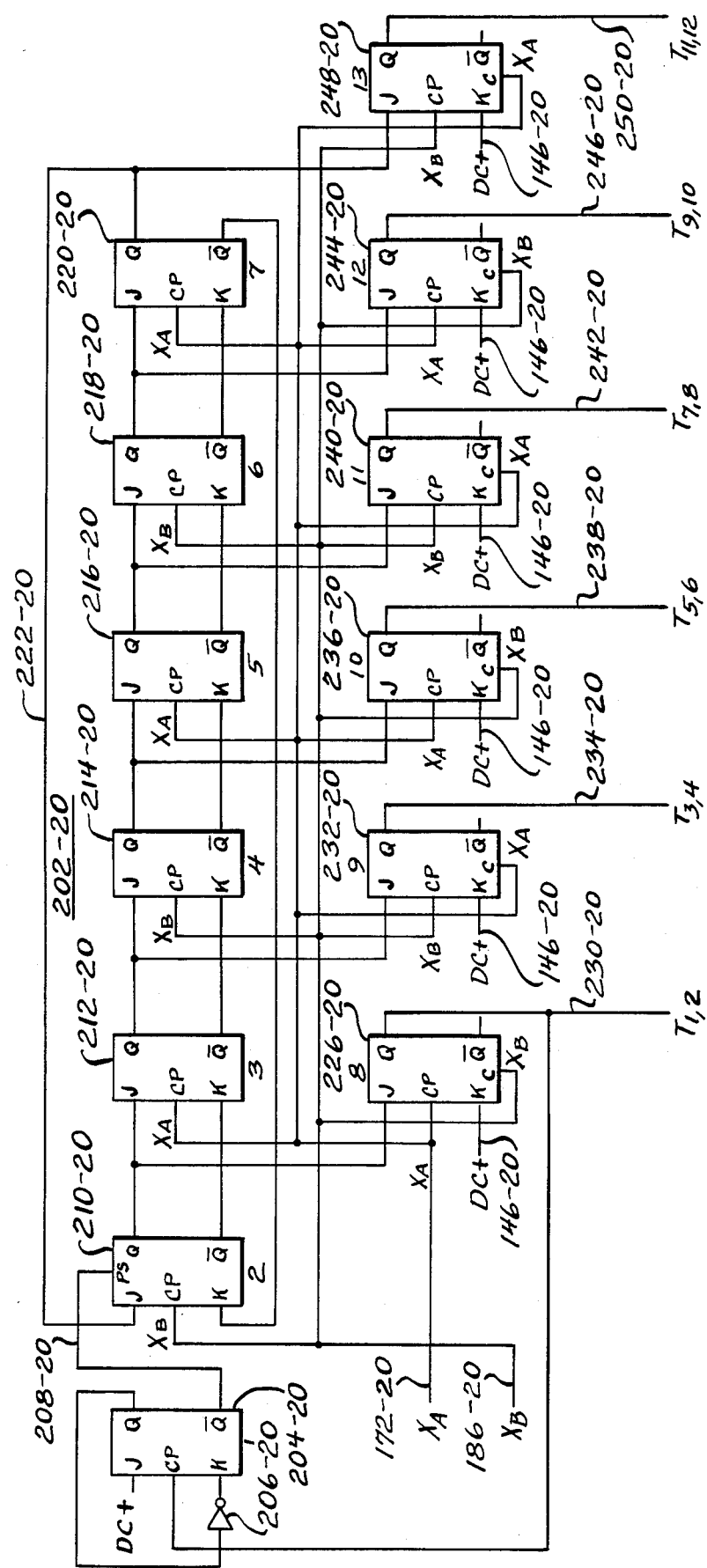
FIG. 8 is a view similar to FIG. 3 for 20 Hz.
Figure 9:
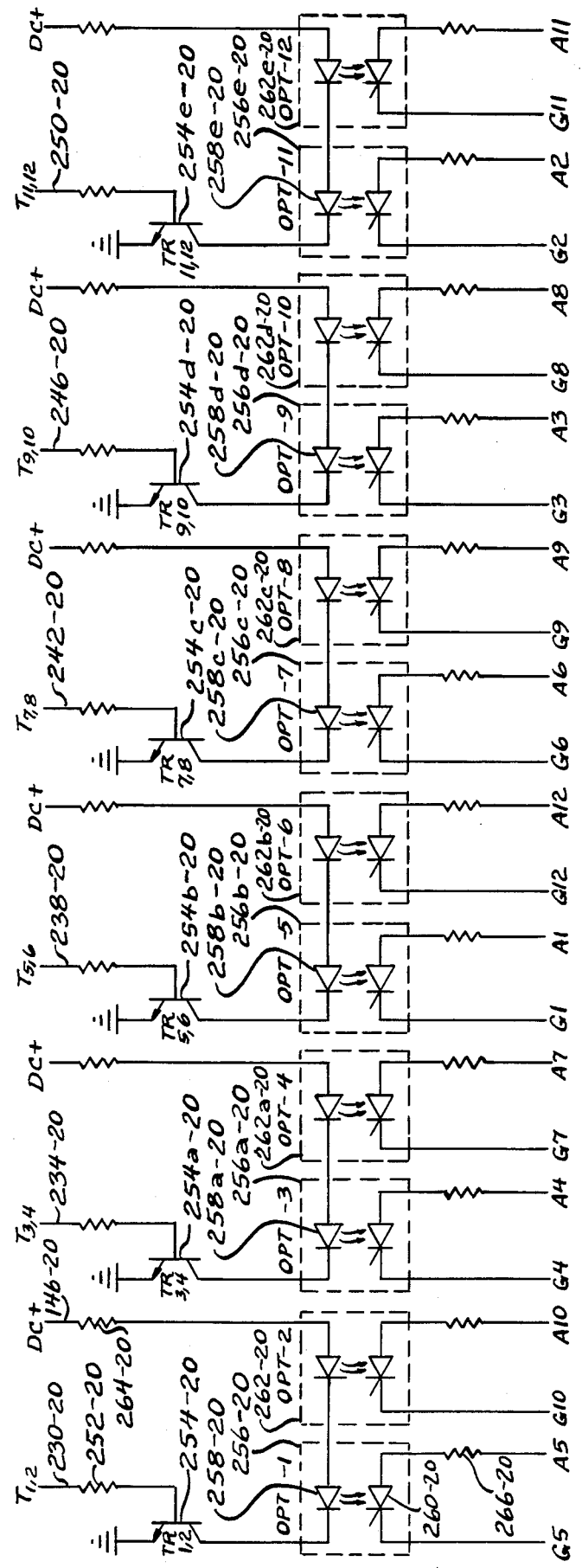
FIG. 9 is a view similar to FIG. 4 for 20 Hz.

The same type of sequencing logic is used in FIG. 8 as in FIG. 3, but the connections through the trigger circuit of FIG. 9 to the power SCR bridge assembly and motor of FIG. 6 are specifically different as will be readily seen with reference to these figures. Not only is the frequency divided by a factor of three, the effective voltage likewise being divided approximately by this figure as explained with regard to FIGS. 1–5, but only two input phases are utilized, whereby the circuit comprises a single phase to three phase convertor.

The phase diagram of FIG. 10 shows the frequency and phase conversion.

Circuits for producing a thirty cycle three phase output wave applied to a three phase motor from a sixty cycle three phase source are shown in FIGS. 11–15. The parts are the same as or similar to those previously disclosed, and similar parts are identified by like numerals with the addition of the suffix 30. The distinction lies in the connection of the output lines from the J-K flip-flops of FIG. 13 to the opto-isolators of FIG. 14, with the outputs of these opto-isolators controlling firing of the SCRs in FIG. 11 in proper sequence. The input wave is shown in FIG. 15a along with the firing pulses for the respective SCRs in FIG. 15 to produce the requisite output wave shown in FIGS. 15c, 15d and 15e. Operation in the thirty cycle mode is substantially the same as for the fifteen cycle mode previously explained in detail with the exception that the clock pulses to the triggering flip-flops are spaced 120 electrical degrees rather than the 240 degree clock pulse spacing utilized by the 15 Hz. mode.

Production of a 40 Hz. three phase wave is illustrated in FIGS. 16–20. Many of the parts are similar to those previously shown and described, and similar numerals are used with the addition of the suffix 40. There are variations as will be pointed out hereinafter. For one thing, 18 SCRs are required in the power bridge rather than 12 as in the circuits previously disclosed. Because of the more complicated sequencing arrangement, 25 flip-flops are utilized instead of the thirteen used in the circuits previously described. Twelve of these flip-flops are used in the ring counter as contrasted with six in previous circuits. Some of the SCRs are fired more often than others, and therefore separate trigger transistors must be utilized to fire each of the opto-isolators one at a time instead of in pairs. Blocking diodes have been added in many instances to prevent crossover and unwanted out-of-sequence triggering of the power SCRs. In addition, invertors have been added at certain places in the logic in order to be able to use negative wave forms for clock pulses as well as to use positive going wave forms, as heretofore. Except for these variations, the 40 Hz. mode operates much the same as the modes previously disclosed in producing a new-balanced three phase wave form to operate an induction motor at a reduced speed.

Reference to FIG. 16 details arrangement of the 18 SCRs used in obtaining the 40 Hz. frequency. The additional SCRs over and above the twelve previously identified are identified by numerals 81-40, 83-40, 85-40, 87-40, 89-40 and 91-40. The specific placement of the SCRs is shown in FIG. 16 and is clear by analogy to the description of FIG. 1 whereby further description is unnecessary.

Turning now to FIG. 18, all of the J-K flip-flops are shown therein. The added flip-flops in the ring counter 202-40 are identified respectively by numerals 211-40, 213-40, 215-40, 217-40, 219-40 and 221-40. Similarly, the six added triggering flip-flops are respectively numbered 223-40, 225-40, 227-40, 229-40, 231-40 and 233-40. As noted, the leads from the triggering J-K flip-flops respectively are connected to only one transistor and opto-isolator. The respective leads in FIG. 18 are identified as T1 through T18. Since some of the triggering leads are controlled by more than one J-K flip-flop, there are isolating diodes provided as necessary, respectively numbered 290, 292, 294, 296, 298, 300, 302, 304, 306, 308, 310 and 312.

In FIG. 19 the respective triggering leads are identified as T1 through T18, the same as in FIG. 18. In FIG. 4, for example, there were six triggering transistors and six pairs of opto-isolators. In FIG. 19 there are eighteen triggering transistors corresponding to the eighteen trigger leads, and beyond the original six transistors, these are identified as 254f-40 through 254q-40. There are also eighteen opto-isolators, and beyond the original six thereof these are identified in FIG. 19 as 256f-40 through 256q-40. Each opto-isolator connects the gate to the anode of one of the SCRs, and these are indicated as G1, A1 through G18, A18.

The input wave form is shown in FIG. 20a and the triggering pulses for the respective SCRs are shown in FIG. 20b. The resultant wave forms are shown in FIGS. 20c through 20e, producing the 40 Hz. three phase wave form into the motor.

It will now be apparent that I have disclosed a frequency dividing circuit for motor control in which a 60 Hz. three phase input wave form is divided to any of 15 Hz., 20 Hz., 30 Hz. or 40 Hz. three phase wave form. An added benefit in the 20 Hz. mode is that only two phases of the supply wave form are necessary, whereby the circuitry comprises a single phase to three phase convertor.

It is important that only readily available, off-the-shelf electronic elements or components are required. Specifically, logic and triggering circuits are combined to produce a phase convertor utilizing a zero fired, naturally commutated SCR bridge to produce output wave forms of various frequencies. Each such output wave form is composed of various half-wave components of the given input wave forms of a specified frequency. The providing of the frequency also produces division of the effective voltage, as is necessary to the three phase A/C motor.

The specific circuits as described herein are for illustrative purposes only. Various changes will no doubt occur to those skilled in the art, and will be understood as forming a part of the present invention insofar as they fall within the spirit and scope of the appended claims.

What is claimed is:

1. A frequency converter is for a multi-phase electric motor comprising input means for connection to a multi-phase alternating current electric supply source, an output means for connection to a multi-phase utilization means such as a multi-phase electric motor, an SCR bridge comprising a plurality of SCRs interconnecting said input means and said output means, trigger circuit means connected to said SCR bridge for effecting selective firing of said plurality of SCRs, means connected to said input means for developing a plurality of timing pulses upon zero crossing of the input means phases, and logic circuit means interconnecting said timing pulse means and said trigger circuit means for effecting selective sequential firing of said plurality of SCRs at said zero crossings, firing of said SCRs being respectively terminated upon reversal of a respective phase.

2. A frequency converter as set forth in claim 1 wherein said input means has a plurality of connections for the respective phases of said electric supply source, said SCR bridge having a plurality of groups each including a plurality of SCRs connected to each input connection, at least one SCR of each group being polarized oppositely to at least one other SCR of that group.

3. A frequency converter as set forth in claim 2 wherein each of said groups has a plurality of SCRs polarized in each direction.

4. A frequency converter as set forth in claim 3 wherein the number of SCRs polarized in one direction in each group is equal to the number of SCRs polarized in the opposite direction in that same group.

5. A frequency converter as set forth in claim 2 wherein said output means has a plurality of output connections respectively corresponding to the phases of said utilization means, at least one SCR of each group being connected to each of said output connections.

6. A frequency converter as set forth in claim 5 wherein at least one of each SCR connected to a given output connection is of opposite polarity relative to at least one other SCR connected to that same output connection.

7. A frequency converter as set forth in claim 1 wherein said logic circuit means comprises a plurality of flip-flops.

8. A frequency converter as set forth in claim 7 wherein a group of said flip-flops is arranged in a ring counter, said ring counter flip-flop being selectively clocked by said pulses.

9. A frequency converter as set forth in claim 8 and further including a second group of flip-flops respectively enabled by the flip-flops of the first-mentioned group and selectively clocked by said pulses, said second group of flip-flops providing trigger pulses to said trigger means.

10. A frequency converter as set forth in claim 1 wherein said trigger circuit means comprises a plurality of electronic switches respectively connected to said SCRs.

11. A frequency converter as set forth in claim 10 wherein each SCR has an anode and a gate, and each electronic switch when conducting connects together the anode and gate of a respective SCR.

12. A frequency converter as set forth in claim 10 wherein the electronic switch includes an opto-isolator.

13. A frequency converter as set forth in claim 12 and further including a plurality of transistors respectively connected to said logic circuit means and to said opto-isolators selectively to render said opto-isolators conductive.

14. A frequency converter as set forth in claim 13 wherein each transistor in connected to a plurality of opto-isolators to render said plurality of opto-isolators simultaneously conductive.

15. A frequency converter as set forth in claim 13 wherein each transistor is connected to only one opto-isolator.

16. A frequency converter as set forth in claim 9 wherein said triggering circuit means comprises a plurality of electronic switches respectively connected to said SCRs.

17. A frequency converter as set forth in claim 16 wherein said SCR has an anode and a gate, and each electronic switch when conducting connects together the anode and the gate of the respective SCR.

18. A frequency converter as set forth in claim 2 wherein said triggers circuit means comprises a plurality of electronic switches respectively connected to said SCRs.

19. A frequency converter as set forth in claim 18 wherein each SCR has an anode and a gate, and each electronic switch when conducting connects together the anode and gate of a respective SCR.

* * * * *